Oct. 14, 1969 E. LEGLER 3,473,139
CIRCUIT ARRANGEMENT FOR MAKING SIMULTANEOUS, EQUAL CHANGES IN THE AMPLIFICATION OF A PLURALITY OF ELECTRICAL SIGNALS
Filed May 6, 1968
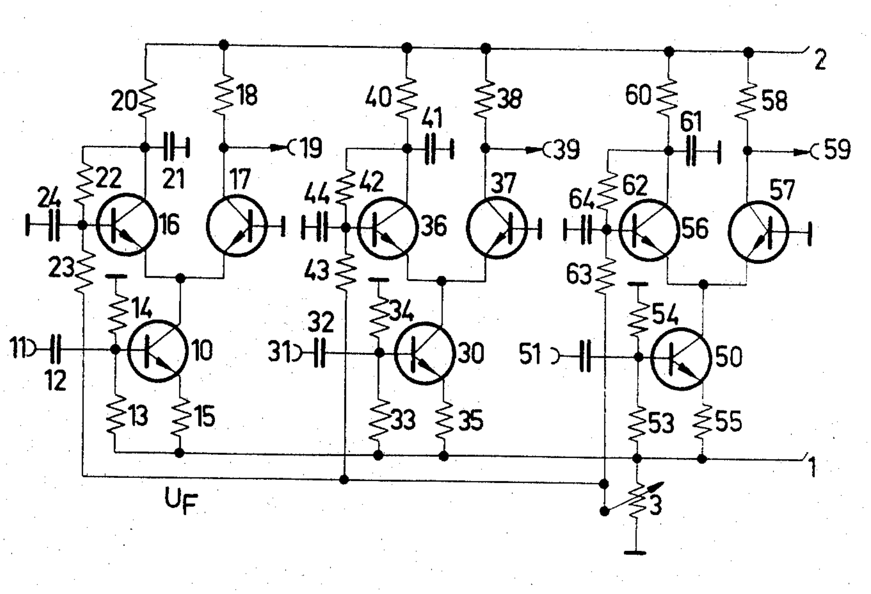
Inventor:
Ernst Legler
by
Michael S. Striker
Attorney 3,473,139

CIRCUIT ARRANGEMENT FOR MAKING SIMULTANEOUS, EQUAL CHANGES IN THE AMPLIFICATION OF A PLURALITY OF ELECTRICAL SIGNALS

Ernst Legler, Seeheim an der Bergstrasse, Germany, assignor to Fernseh GmbH, Darmstadt, Germany Filed May 6, 1968, Ser. No. 726,703
Claims priority, application Germany, May 10, 1967, F 52,371
Int. Cl. H03f *3/68*
U.S. Cl. 330—30 6 Claims

ABSTRACT OF THE DISCLOSURE

Each signal to be amplified modulates the constant direct current output of a corresponding constant current source. The emitter-collector circuit of a first transistor is connected to the output of each constant current source, while its base is connected to a fixed potential. The emitter-collector circuit of a second transistor is connected in parallel with the first emitter-collector circuit. D.C. feedback is provided between the collector and base circuits in each second transistor. A single potentiometer for furnishing a variable D.C. voltage is connected to a base circuit resistor in each of the second transistor circuits, variations of this D.C. voltage causing simultaneous and equal changes in the output signal voltages derived from a resistor in the emitter-collector circuit of each said first transistors.

Background of the invention

This invention relates to circuit arrangements for effecting simultaneous and substantially equal changes in the amplification of a plurality of input signals. Arrangements of this type are known, in which each of said input signals is applied as modulation to a constant current source, each of which then furnishes a constant direct current modulated by the corresponding input signal. Each of the modulated current output of said plurality of constant current sources flows through the emitter-collector circuit of one of a corresponding plurality of first transistors, each of which has a base connected to the same fixed potential. In parallel with the emitter-collector of each of said first transistors is connected the emitter-collector circuit of a second transistor. The bases of all of the second transistors are connected to a variable source of direct voltage. The constant current furnished by the constant current sources divides between each pair of first and second transistors in accordance with the voltage applied to the base of each second transistor by means of the variable direct voltage source. Because of the logarithmic form of the voltage-current characteristic of the transistors, the direct current and signal current distributions are affected in a similar fashion, thus causing the signal voltage derived from a resistor in the collector circuit of the first transistor to vary in dependence on the variation of direct voltage applied to the base of the second transistor.

The essential requirement of an arrangement as described above, is that the amplification of all input signals be equal. This equality of amplification is not achieved in the conventional circuits, because of unavoidable tolerances in both the transistors and circuit elements used. In particular, these tolerances may cause large inequalities in the amplification of one signal as compared to the amplification of others, when it is desired to vary the amplification over a large range.

Summary of the invention

This invention comprises a circuit arrangement for providing substantially simultaneous and equal changes in the amplification of a plurality of input signals. The circuit arrangement comprises a plurality of modulable constant current sources, each adapted to furnish an output current comprising a substantially constant direct current modulated in dependence upon a corresponding one of said input signals. A plurality of first amplifier means is furnished, each having a control electrode connected to a fixed potential, and an output circuit connected in such a manner that the output current of a corresponding one of said constant current sources flows therethrough. The output circuits of a plurality of second amplifiers, are each connected in parallel with the aforementioned output circuits of the first amplifiers, thus causing a percentage of the output current of said modulable constant current source to flow therethrough. The second amplifier means further each have an input circuit, and direct current negative feedback means connected between each output and input circuit. One variable direct current voltage source is connected to all of said second amplifier input circuits, variation of said variable voltage resulting in changes in the current distribution between said first and second amplifier output circuits and thus in corresponding changes in all of said amplified input signals, which are derived from a plurality of load resistors, one in each of said first amplifier output circuits.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Brief description of the drawing

The figure is a circuit diagram showing an arrangement for providing substantially simultaneous and equal changes in the amplification of a plurality of input signals.

Description of the preferred embodiments

Reference to the figure will show a circuit arrangement for effecting substantially equal and simultaneous changes in the amplification of three input signals. This type of circuit could, for example, be used in amplifiers in a color television transmission or receiving system, wherein the contrast adjustment consists of a desired simultaneous and equal change in the amplification of the signals corresponding to the three colors red, green and blue.

Reference to the figure will also show that it is possible to construct circuit arrangements of this type using only transistors of a particular conductivity type, thus allowing use of a single type of transistor throughout the whole arrangement.

One of the three input signals is applied at each of the input terminals 11, 31, and 51 and applied to the base of a transistor 10, 30 and 50 by means of capacitor 12, 32 and 52 respectively. Transistors 10, 30 and 50 serve as constant current sources. Supply voltage is furnished to the arrangement on first and second supply voltage line 1 and 2 respectively. The quiescent voltage for the bases of transistors 10, 30 and 50 respectively is furnished by voltage dividers connected from said first supply voltage line to ground. These consist of resistors 13 and 14, 33 and 34, and 53 and 54, respectively. Emitter resistors 15, 35 and 55 are connected from said first supply voltage line to the emitters of transistors 10, 30 and 50 respectively.

To the collectors of transistors 10, 30 and 50 is connected to the output circuit of first amplifier means, in the figure the emitter-collector circuit of transistors 17, 37, and 57 respectively. The control electrodes of all of these first amplifier means, namely the bases of these transistors, are all connected to the same fixed potential, which, in the figure, is ground potential. In particular, the emitter of transistors 17, 37 and 57 respectively are connected to the collectors of transistors 10, 30 and 50 respectively. The collectors of transistors 17, 37 and 57 are each connected to the second supply voltage line by means of load resistors, namely resistors 18, 38 and 58 respectively. The desired amplified input signals are derived at the common point of the respective collectors and load resistors and are available at terminals 19, 39, and 59 respectively. The output circuit of second amplifier means, here transistors 16, 36 and 56, is connected in parallel with the output circuits of the first amplifier means. In particular, the emitter of each of transistors 16, 36 and 56 is connected respectively to the collector of transistors 10, 30 and 50.

In accordance with this invention, negative feedback means are provided for each of the transistors 16, 36 and 56. Thus a resistor 20, 40 and 60 is connected between the collector of each of the transistors 16, 36 and 56 and the second supply voltage line. The quiescent current of each of said transistors causes a voltage drop to appear across said resistors. Currents of signal frequency are short-circuited to ground by means of capacitors 21, 41, and 61 respectively connected between the collectors of transistors 16, 36 and 56 and ground potential. In order to obtain a large direct current negative feedback, the collector potential of each of the second amplifier transistors is now coupled back to the base of each of said transistors. This is accomplished by three voltage dividers, consisting of resistors 22 and 23, 42 and 43, and 62 and 63. Feedback at signal frequencies is prevented by means of capacitors 24, 44 and 64 connected to ground potential from the base of transistors 16, 36 and 56 respectively. These capacitors must each be of such a value that they serve as effective short circuits at the lowest frequency of the input signals.

In order to effect changes in the amplification of each of said input signals, the base of the second amplifier means, namely transistors 16, 36 and 56 respectively, is connected to a direct voltage which is variable with respect to the fixed potential at which the base of the first amplifier means, namely transistors 17, 37 and 57 are operated. The simultaneous change of the base potentials of all of the second amplifier transistors is effected by connecting together the second terminal of resistors 23, 43 and 63 and connecting these to the variable arm of the potentiometer 3 connected between said first supply voltage line and ground potential. By means of changes in the setting of this potentiometer, the quiescent current of transistors 16 36 and 56 may be varied between 0 and 100% of the total current furnished by constant current sources embodied in transistors 10, 30 and 50 respectively. Thus the amplification of the input signals may be varied between a maximum value and 0.

It is generally desirable to provide trimmer resistors for those resistors whose value particularly affects the overall amplification, so that initial adjustments may be made to equalize the amplification of each input signal. In particular, such trimmer resistors would be desirable for resistances, represented by the resistors 38 and 58.

Values for circuit elements

| | | |
|---|---|---|
| Transistors: | | |
| 10, 30, 50, 16, 36, 56, 17, 37, 57 | | 2N708 |
| Resistors: | | |
| 13, 33, 53 | | 12KΩ |
| 14, 34, 54 | | 33KΩ |
| 15, 35, 55 | | 680Ω |
| 18, 38, 58 | | 1,5KΩ |
| 20, 40, 60 | | 3KΩ |
| 22, 42, 62 | | 10KΩ |
| 23, 43, 63 | | 13KΩ |
| Potentiometer: | | |
| 3 | | 1KΩ |
| Capacitors: | | |
| 12, 32, 52 | μf | 10 |
| 21, 41, 61 | μf | 2,2 |
| 24, 44, 64 | μf | 150 |
| Supply voltage relative to ground: | | |
| 1 | v | −12 |
| 2 | v | +12 |

While the invention has been illustrated and described as embodied in a particular type of feedback arrangement, it is not intended to be limited to the details shown since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of the invention and, therefore, such adaptations should and are intended to be comprehended within the meaning and range of equivalence of the following claims.

What is claimed as new and desired to be protected by Letters Patent is set forth in the appended claims.

1. A circuit arrangement for providing substantially simultaneous and equal changes in the amplification of a plurality of input signals, comprising in combination, a plurality of modulable constant current sources, each adapted to furnish an output current comprising a substantially constant direct current modulated in dependence upon a corresponding one of said input signals; a plurality of first amplifier means each having a control electrode connected to a fixed potential, and an output circuit connected in such a manner that the output current of a corresponding one of said constant current sources flows therethrough, each operated in such a manner that the amplitude of signal current in said output circuit is at least in part a function of the direct current flowing therethrough; a load resistor, for furnishing the respective amplified input signals, connected in each of said first amplifier output circuits; a plurality of second amplifier means, each having a second amplifier output circuit connected in parallel to a corresponding one of said first amplifier output circuits, thus causing a percentage of the output current of said constant current source to flow therethrough, and a second amplifier input circuit; direct current negative feedback means connected between said second amplifier output and input circuits; and one variable direct current voltage source connected to all of said second amplifier input circuits, variation of said variable voltage resulting in corresponding changes in the current distribution between said first and second amplifier output circuits and thus in corresponding changes in all of said amplified input signals.

2. A circuit arrangement as set forth in claim 1 wherein said first amplifier means each comprise a first transistor, wherein the output circuit of said first amplifier means comprises the emitter-collector circuit of said first transistor, and wherein said control electrode comprises the base of said first transistor; and wherein said second amplifier means comprise a second transistor, having an output circuit comprising an emitter-collector circuit and an input circuit comprising the emitter-base circuit.

3. An arrangement as set forth in claim 2 wherein said negative feedback means comprise voltage divider means, each adapted to feed a percentage of the collector voltage of each of said second transistors to the corresponding base of said second transistors.

4. A circuit arrangement as set forth in claim 3 wherein said voltage divider means each comprise a first resistor connected between the collector and base of said second amplifier transistor, and a second resistor connected between said base and said variable direct voltage source.

5. A circuit arrangement as set forth in claim 2 wherein all of said transistors are of the same conductivity type.

6. A circuit arrangement as set forth in claim 1, also comprising means for initially adjusting the amplification of each input signal to the same initial value.

References Cited

UNITED STATES PATENTS

| | | | |
|---|---|---|---|
| 2,492,542 | 12/1949 | Stone | 330—124 X |
| 3,210,683 | 10/1965 | Pay | 330—69 X |

ROY LAKE, Primary Examiner

LAWRENCE J. DAHL, Assistant Examiner

U.S. Cl. X.R.

330—124